United States Patent [19]

Ritter, II

[11] 4,362,768

[45] Dec. 7, 1982

[54] TREATMENT OF GLASS FOR HIGH TEMPERATURE RESISTANCE

[75] Inventor: George W. Ritter, II, Newark, Ohio

[73] Assignee: Owens-Corning Fiberglas Corporation, Toledo, Ohio

[21] Appl. No.: 293,035

[22] Filed: Aug. 14, 1981

[51] Int. Cl.³ .............................................. B05D 3/10
[52] U.S. Cl. ...................................... 427/307; 65/31; 156/662; 427/403; 427/419.1; 427/419.3
[58] Field of Search ...................... 427/307, 403, 419.3, 427/419.1; 156/662; 65/31

[56] References Cited

U.S. PATENT DOCUMENTS

| | | | |
|---|---|---|---|
| 2,617,745 | 11/1952 | Raymond et al. | 427/419.3 |
| 3,189,563 | 6/1965 | Havel | 427/419.3 |
| 3,262,767 | 7/1966 | Wang | 65/31 |
| 4,035,210 | 7/1977 | Ohyoshi et al. | 427/307 |
| 4,100,330 | 7/1978 | Donley | 427/419.3 |

*Primary Examiner*—Norman Morgenstern
*Assistant Examiner*—Janyce A. Bell
*Attorney, Agent, or Firm*—Ronald C. Hudgens; Robert F. Rywalski; Philip R. Cloutier

[57] ABSTRACT

A method of improving the resistance of glass fibers to high temperatures which comprises treating the fibers with tetrahydrofuran-2, 3, 4, 5-tetracarboxylic acid to leach the fibers prior to the deposition of a refractory metal on their surfaces.

10 Claims, No Drawings

TREATMENT OF GLASS FOR HIGH TEMPERATURE RESISTANCE

TECHNICAL FIELD

This invention pertains to a method of treating glass fibers to improve their resistance to high temperatures.

In one of its more specific aspects, this invention pertains to a method of improving the stability of glass fibers when subjected to high temperatures.

BACKGROUND OF THE INVENTION

Various methods of improving the high temperature resistance of vitreous materials are well known. Particularly important in this field are those methods in which a refractory metal oxide is deposited on the surface of glass fibers.

U.S. Pat. No. 2,901,379 is directed to the use of metal oxides having a melting point of at least 1000° C. and defines as suitable oxides $Fe_2O_3$, $MgO$, $Cr_2O_3$ and the like.

U.S. Pat. No. 3,232,782 suggests coatings consisting essentially of at least one compound selected from the group consisting of the oxides and silicates of chromium, aluminum, zirconium, titanium, and metals of Group II of the Periodic Table having an atomic number from 4 to 12.

U.S. Pat. No. 3,449,137 suggests the fusing into the glass of specific amounts of chromic oxide with a very limited range of relative proportions of alumina and silica.

U.S. Pat. No. 4,169,182 states that effective substances for absorbing radiant heat energy are metals such as Cu, Co, Fe, Cr, Mn and Ni and these materials can be either mixed in the glass raw materials and thereafter forming the mixture into fibers, or by forming a coating film of such materials or their oxides on the glass fibers.

The deposition of such metals on glass fibers, while improving the temperature resistance of the fibers, produced fibers having limited flexural properties.

BRIEF SUMMARY OF THE INVENTION

There has now been discovered a method of improving the flexural strength of glass fibers which involves, prior to the deposition on the surface thereof, a refractory material, the leaching of magnesium therefrom by contacting the fiber with tetrahydrofuran-2,3,4,5-tetracarboxylic acid. The leached fiber can then be contacted, successively, with colloidal silica, an aqueous solution of the salt of the refractory metal, ammonium hydroxide and, again if desired, with colloidal silica, all to improve the flexural properties of the fiber at high temperatures.

In one embodiment of the invention, the contact with the colloidal silica is made before the hydrolysis step employing the ammonium hydroxide, i.e., the colloidal silica is in the $CrCl_3.6H_2O$ solution.

In another embodiment of this invention, tetraethyl-ortho-silicate is substituted for colloidal silica.

DETAILED DESCRIPTION

The method of this invention is applicable to any vitreous material employed as glass fiber insulation. It is particularly applicable to glass fibers possessing magnesium ions on their surface.

By refractory materials are meant oxides and silicates of chromium, aluminum, zirconium, titanium, and metals of Group II of the Periodic Table having an atomic number from 4 to 12.

The method of this invention is carried out by contacting the size-free glass with the tetrahydrofuran-2, 3, 4, 5-tetracarboxylic acid (THFCA) in the form of about a 1 to about 3 weight percent aqueous solution for a period of about 24 to about 72 hours.

Preferably, the THFCA will be in the form of a buffered solution comprising tetrahydrofuran-2,3,4,5-tetracarboxylic acid comprising from about 1 to about 3 weight percent THFCA, and about 7 weight percent of an aqueous buffer solution comprising about 6.5 weight percent ammonium chloride, and about 57 weight percent concentrated ammonium hydroxide, the pH of the buffer and THFCA solution being 10 and 9, respectively.

The solution containing the glass fibers should be sealed to prevent loss of ammonia.

After so treating the glass fibers, they are drained dry and contacted with the colloidal silica.

Any suitable colloidal silica can be employed. One such silica is commercially available as Ludox AS-40. This material is an aqueous colloidal silica sol available from duPont of Wilmington, Delaware and comprises about 40 percent by weight $SiO_2$ in water and is stabilized with about 2 percent ammonia.

The glass fibers are contacted with the colloidal silica in the "as received" state for a period of time sufficient to wet out the glass fibers.

The fibers are drained dry and then immersed in a 7 to 9 weight percent aqueous solution of the refractory salt (having an oxide equivalent of 1 to 3 weight percent on the fiber) for a period of time sufficient to wet the glass fibers. The fibers are removed from the solution and drained of excess solution.

If desired, the contact of the glass fibers with the colloidal silica and the refractory salt can be made simultaneously by simply immersing the glass fibers in a combination of the colloidal silica and the aqueous solution of the refractory salt.

The glass fibers are then immersed in concentrated ammonium hydroxide for a period sufficient to wet them, and then in colloidal silica, in that order, the latter contact being in the same manner and under the same conditions as originally contacted as set forth above.

The following example demonstrates the method of this invention.

EXAMPLE I

A quantity of glass fibers is immersed in a quantity of 1.5 weight percent tetrahydrofuran-2,3,4,5-tetracarboxylic acid solution for a period of 72 hours. The THFCA solution is buffered with a buffered solution comprising 6.5 weight percent ammonium chloride and 55 weight percent concentrated ammonium hydroxide. Thereafter, the fibers are removed from the solution and drained dry.

The fibers are then contacted with colloidal silica by immersing therein and stirring for a period of about two minutes. The fibers are removed and drained dry.

The fibers are then immersed in an 8 weight percent solution of chromium chloride hexahydrate for a period of three minutes. The fibers are removed and are then immersed in concentrated ammonium hydroxide for a period of three minutes and are again contacted with colloidal silica in the same manner as previously described.

The fibers are oven dried and then subjected to a heat soak at 1600° F. (871° C.) after which the fibers are still flexible, as desired.

It will be evident from the foregoing that various modifications can be made to this invention. However, such are considered within the scope of the invention.

I claim:

1. A method of treating glass fibers to improve their resistance to high temperatures which comprises:
   a. contacting said fibers with tetrahydrofuran-2, 3, 4, 5-tetracarboxylic acid to produce leached fibers;
   b. contacting said leached fibers with colloidal silica; and
   c. contacting the fibers from step b. with an aqueous solution of the salt of a refractory metal to deposit said refractory metal salt thereon.

2. The method of claim 1 in which said glass fibers comprise magnesium ions.

3. The method of claim 1 in which said fibers are leached in a 1 to about 3 weight percent solution of said acid for about 24 to about 72 hours.

4. The method of claim 3 in which said tetrahydrofuran-2,3,4,5-1-tetracarboxylic acid is in the form of a buffered solution.

5. The method of claim 1 in which said refractory metal is selected from the group consisting of chromium, aluminum, zirconium, titanium and metals of Group II of the Periodic Table having an atomic number from 4 to 12.

6. The method of claim 3 in which said buffered solution comprises about 6.5 weight percent ammonium chloride and about 57 weight percent concentrated ammonium hydroxide.

7. The method of claim 1 in which said salt of the refractory metal is chromium chloride hexahydrate.

8. The method of claim 1 in which following step c. said fibers are contacted with ammonium hydroxide and with colloidal silica.

9. The method of claim 1 in which said leached fibers are simultaneously contacted with colloidal silica and with the aqueous solution of the salt of a refractory metal.

10. The method of claim 6 in which the pH of the buffer solution is 10 and the pH of the tetrahydrofuran-2,3,4,5-tetracarboxylic solution is 9.

* * * * *